US010602078B2

(12) United States Patent
Michiguchi

(10) Patent No.: US 10,602,078 B2
(45) Date of Patent: Mar. 24, 2020

(54) DISPLAY CONTROL DEVICE WHICH CONTROLS VIDEO EXTRACTION RANGE

(71) Applicant: PANASONIC INTELLECTUAL PROPERTY MANAGEMENT CO., LTD., Osaka (JP)

(72) Inventor: Masayoshi Michiguchi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/111,814

(22) Filed: Aug. 24, 2018

(65) Prior Publication Data

US 2019/0068898 A1 Feb. 28, 2019

(30) Foreign Application Priority Data

Aug. 25, 2017 (JP) .................. 2017-162629

(51) Int. Cl.
*H04N 5/262* (2006.01)
*H04N 5/44* (2011.01)
*H04N 5/445* (2011.01)
*B60R 1/00* (2006.01)
*B60R 1/12* (2006.01)
*B60R 1/06* (2006.01)

(52) U.S. Cl.
CPC ............ *H04N 5/2628* (2013.01); *B60R 1/00* (2013.01); *B60R 1/002* (2013.01); *H04N 5/4403* (2013.01); *H04N 5/445* (2013.01); *B60R 1/06* (2013.01); *B60R 1/12* (2013.01); *B60R 2001/1215* (2013.01); *B60R 2300/105* (2013.01); *B60R 2300/30* (2013.01); *B60R 2300/60* (2013.01)

(58) Field of Classification Search
CPC .... H04N 5/2628; H04N 5/445; H04N 5/4403; B60R 1/002
USPC ........................................ 348/148
See application file for complete search history.

(56) References Cited

U.S. PATENT DOCUMENTS

| 1,026,918 A1 | 4/2019 | Kawamoto et al. |
| 2012/0188457 A1 | 7/2012 | Kato |
| 2014/0195957 A1* | 7/2014 | Bang ................... G06F 3/04812 715/773 |

(Continued)

FOREIGN PATENT DOCUMENTS

| JP | 09-116806 | 5/1997 |
| JP | 2012-156797 | 8/2012 |

(Continued)

*Primary Examiner* — Hee-Yong Kim
(74) *Attorney, Agent, or Firm* — Greenblum & Bernstein, P.L.C.

(57) ABSTRACT

A display control device is installed in a vehicle and causes to display a video of an area around the vehicle from an imaging device to be displayed on a display device. An acquirer acquires a first video serving as a processing target from the imaging device. A receiver receives an instruction to move an extraction range for extracting at least a part of the first video acquired by the acquirer. An output unit outputs a second video extracted in the extraction range moved in accordance with the instruction received by the receiver to the display device. When the extraction range moved in accordance with the instruction received by the receiver reaches an end portion of the first video, the output unit gives a notification indicating the reaching.

4 Claims, 11 Drawing Sheets

(56) References Cited

U.S. PATENT DOCUMENTS

| | | |
|---|---|---|
| 2017/0169621 A1 | 6/2017 | Kawamoto et al. |
| 2018/0213162 A1* | 7/2018 | Tsutsumitake ....... H04N 5/2628 |
| 2018/0335901 A1* | 11/2018 | Manzari ................ G06F 3/0482 |
| 2019/0188921 A1 | 6/2019 | Kawamoto et al. |

FOREIGN PATENT DOCUMENTS

| | | |
|---|---|---|
| JP | 2017-024464 | 2/2017 |
| WO | 2016/013272 | 1/2016 |

\* cited by examiner

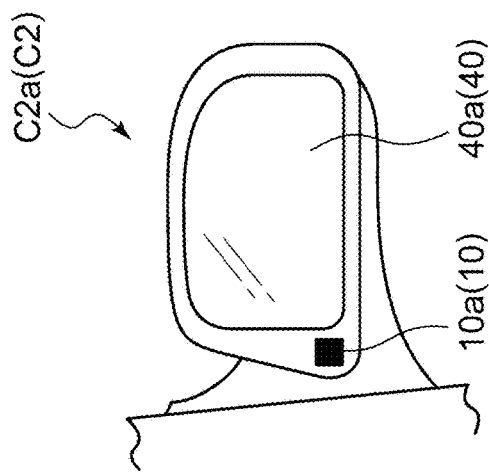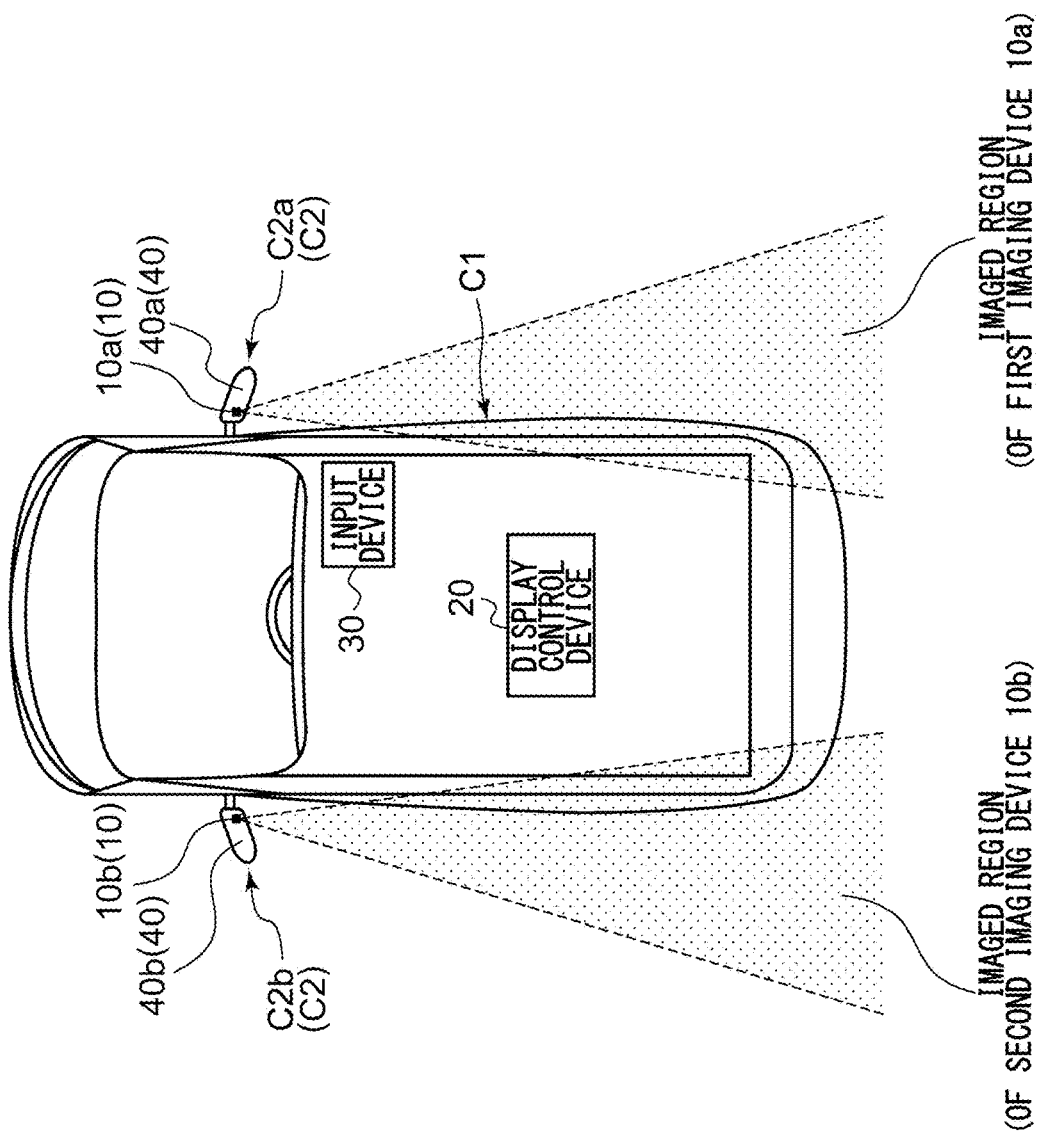

70

40

70

40

70

40

70

40

70

40

70

40

70

40

70

40

40

40

40

40

DISPLAY CONTROL DEVICE WHICH CONTROLS VIDEO EXTRACTION RANGE

BACKGROUND

1. Field

The present disclosure relates to a display control technique of displaying a video of an area around a vehicle for a driver, and more particularly, to a display control device which controls a video extraction range.

2. Description of the Related Art

In order to control a photographing direction and zooming of a camera, a first frame indicating a potential photographing range specified by a limit of control and a second frame indicating a photographing range according to a current setting are displayed on a display device (for example, see JP 9-116806 A).

There are vehicles including electronic mirrors instead of side mirrors or rearview mirrors. In the electronic mirror, a partial region of a video captured by an imaging device is extracted and displayed on a display device. In order to set a partial region to be extracted from a video, for the video captured in the imaging device, a video extracted in a range to be extracted (hereinafter referred to as an "extraction range") is displayed on the display device.

For example, a user moves the extraction range by manipulating an input device such as a cross key. In such a manipulation, if the extraction range reaches an end portion of the video, even though the input device is manipulated, the video extracted in the extraction range does not move.

SUMMARY

The present disclosure is made in light of the foregoing, and it is an object of the present disclosure to provide a technique of giving a notification indicating that the extraction range reaches the end portion of the video when the video of the area around the vehicle is displayed for the driver.

In order to solve the above issue, a display control device according to an aspect of the present disclosure is installed in a vehicle and causes a video of an area around the vehicle from an imaging device to be displayed on a display device. The display control device comprises: an acquirer that acquires a first video serving as a processing target from the imaging device; a receiver that receives an instruction to move an extraction range for extracting at least a part of the first video acquired by the acquirer; and an output unit that outputs a second video extracted in the extraction range moved in accordance with the instruction received by the receiver to the display device. When the extraction range moved in accordance with the instruction received by the receiver reaches an end portion of the first video, the output unit gives a notification indicating the reaching.

Further, an arbitrary combination of the above components and the expressions of the present disclosure converted into a method, an apparatus, a system, a recording medium, a computer program, and the like are also effective as embodiments of the present disclosure.

BRIEF DESCRIPTION OF THE DRAWINGS

FIGS. 1A and 1B are diagrams schematically illustrating a configuration of a vehicle in an embodiment;

DETAILED DESCRIPTION

Figure 2:
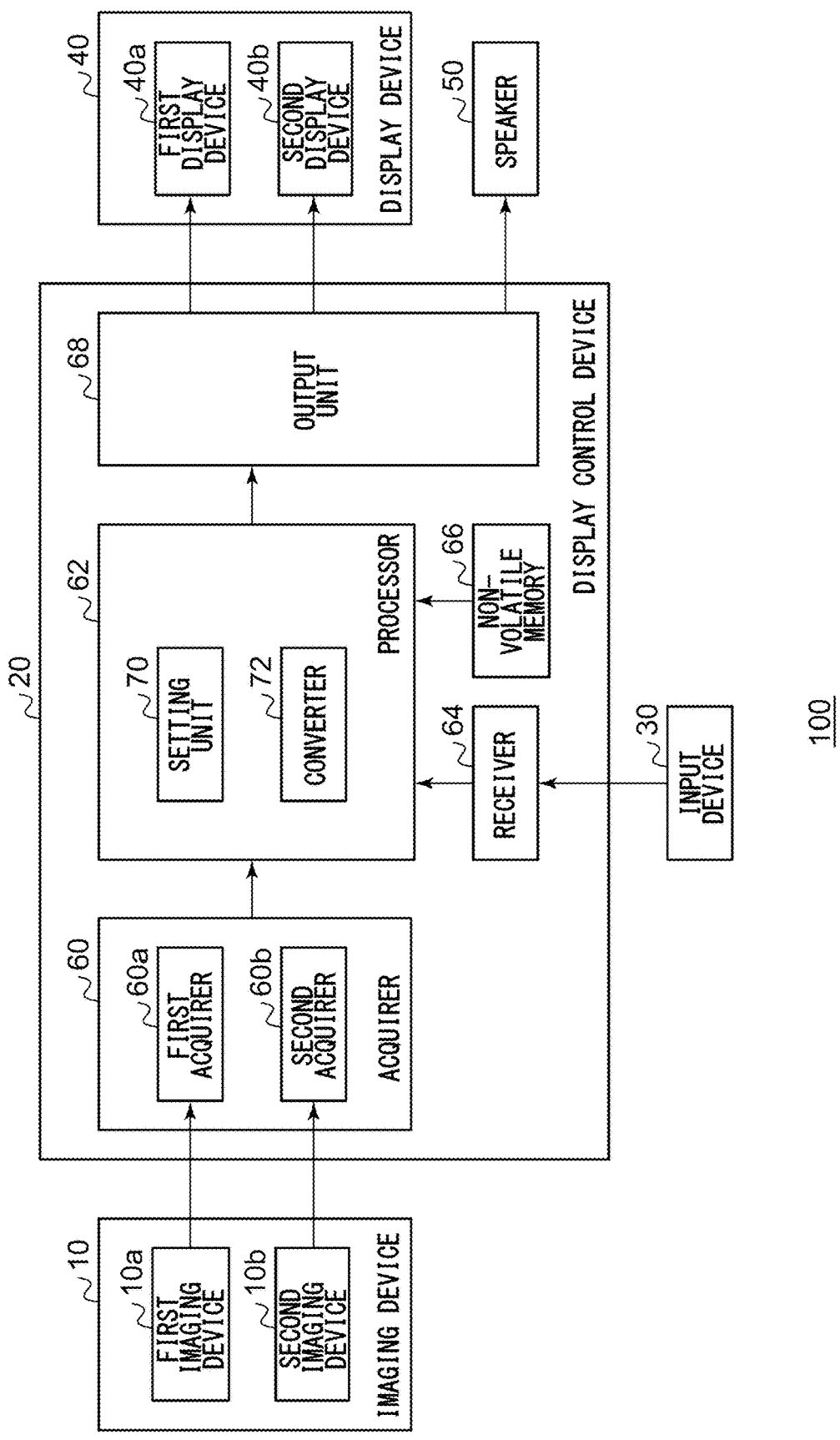
FIG. 2 is a diagram illustrating a configuration of a video display system according to an embodiment.

The invention will now be described by reference to the preferred embodiments. This does not intend to limit the scope of the present invention, but to exemplify the invention.

An overview will be described before an embodiment of the present disclosure is specifically described. An embodiment of the present disclosure relates to a video display system installed in a vehicle. The video display system is used in, for example, an electronic mirror. An imaging device installed instead of the side mirrors or the rearview mirror images a video of an area around a vehicle corresponding to each mirror, and a display control device causes a video extracted in a preset extraction range (hereinafter referred to as an "extracted video") to be displayed on the display device. The extracted video is a video corresponding to a reflected image of the side mirror or the rearview mirror. Here, attention is focused on the setting of the extraction range. The display control device, for example, has an input device such as a cross key, and the user (driver) moves the extraction range on the video by manipulating the input device. As the extraction range moves, the extracted video displayed on the display device changes. While checking the changing extracted video, the user stops the manipulation on the input device and causes the extraction range to be stopped if a desired extracted video is displayed. The extraction range is set at the stopped position.

If the extraction range is continuously moved in a predetermined direction, for example, the right direction under such circumstances, a right end portion of the extraction range (hereinafter referred to as an "extraction range right end portion") reaches a right end portion of the video captured by the imaging device (hereinafter referred to as a "video right end portion"). Here, when the extraction range and the video have a rectangular shape, the extraction range right end portion corresponds to one side of the extraction range on the right side, and the video right end portion corresponds to one side of the video on the right side. In a state where the extraction range right end portion reaches the video right end portion, even if the user further moves the extraction range in the right direction, the extracted video displayed on the display device does not change. When the extracted video does not change although the input device is manipulated, the user is unable to know whether or not the extraction range is unable to be moved anymore or whether or not the device has a failure. In order to cope with this, in the present embodiment, when the extraction range right end portion reaches the video right end portion, that is, when the end portion of the extraction range reaches the end portion of the video, a notification indicating the reaching is given.

FIGS. 1A and 1B schematically illustrate a configuration of a vehicle C1. FIG. 1A illustrates the entire vehicle C1, and FIG. 1B illustrates a part of a side mirror C2 of the vehicle C1. A video display system 100 to be described later is installed in the vehicle C1. In the video display system 100, a partial region of the video (imaged region) captured by an imaging device 10 is extracted by a display control device 20 and displayed on a display device 40.

FIG. 2 illustrates a configuration of the video display system 100. The video display system 100 includes a first imaging device 10a and a second imaging device 10b which are referred to collectively as an imaging device 10, a display control device 20, an input device 30, a first display device 40a and a second display device 40b which are referred to collectively as a display device 40, and a speaker 50. The display control device 20 includes a first acquirer 60a and a second acquirer 60b which are referred to collectively as an acquirer 60, a processor 62, a receiver 64, a non-volatile memory 66, and an output unit 68, and the processor 62 includes a setting unit 70 and a converter 72.

The imaging device 10 is installed in the vehicle C1 and captures the video of the area around the vehicle. When the imaging device 10 is used in the side mirrors C2, the first imaging device 10a is installed on the right side of the vehicle C1 and captures a video backwards, and the second imaging device 10b is installed on the left side of the vehicle C1 and captures a video backwards. The imaging device 10 outputs the captured videos to the display control device 20.

The acquirer 60 acquires the video from the imaging device 10, that is, a first video serving as a processing target. The acquirer 60 is configured with, for example, a volatile memory and temporarily stores the video without processing but may perform a predetermined process on the video. Here, the first acquirer 60a acquires the first video from the first imaging device 10a, and the second acquirer 60b acquires the first video from the second imaging device 10b. In the following description, the description will proceed on the basis of one first video, but it is preferable that a similar processing be performed on the other first video. The acquirer 60 outputs the first video to the processor 62.

The setting unit 70 sets information related to the extraction range to be displayed on the display device 40 among the first videos serving as the processing target. The information related to the extraction range corresponds to coordinates of four vertices when the extraction range has a rectangular shape. The information related to the extraction range may include coordinates of one vertex among the four vertices, for example, an upper left vertex, a length of a side in a lateral direction, and a length of a side in a vertical direction.

The converter 72 extracts a part of the extraction range from the first video serving as the processing target on the basis of the information related to the extraction range in the setting unit 70. For such a process, the converter 72 converts the first video in accordance with a look-up table (hereinafter referred to as an "LUT") stored in the non-volatile memory 66 with reference to the LUT. For example, the converter 72 converts the first video by causing coordinate data of the LUT to be offset in accordance with coordinate information acquired from the setting unit 70. Since a known technique may be used for such a process, detailed description will be omitted here, but the LUT at this time is referred to as a "normal LUT." Further, the first video converted in accordance with the LUT corresponds to the extracted video and also referred to as a second video.

The output unit 68 receives the extracted video from the processor 62 and causes the extracted video to be displayed on the display device 40. The display device 40 is a display installed in the vehicle C1, and in the present embodiment, the display device 40 is attached to side mirrors C2 (a right side mirror C2a and a left side mirror C2b) of the vehicle C1. The display device 40 displays the extracted video received from the output unit 68. Further, the first display device 40a attached to the right side mirror C2a displays the extracted image extracted from the first imaging device 10a, and the second display device 40b attached to the left side mirror C2b displays the extracted image extracted from the second imaging device 10b.

Figure 3:
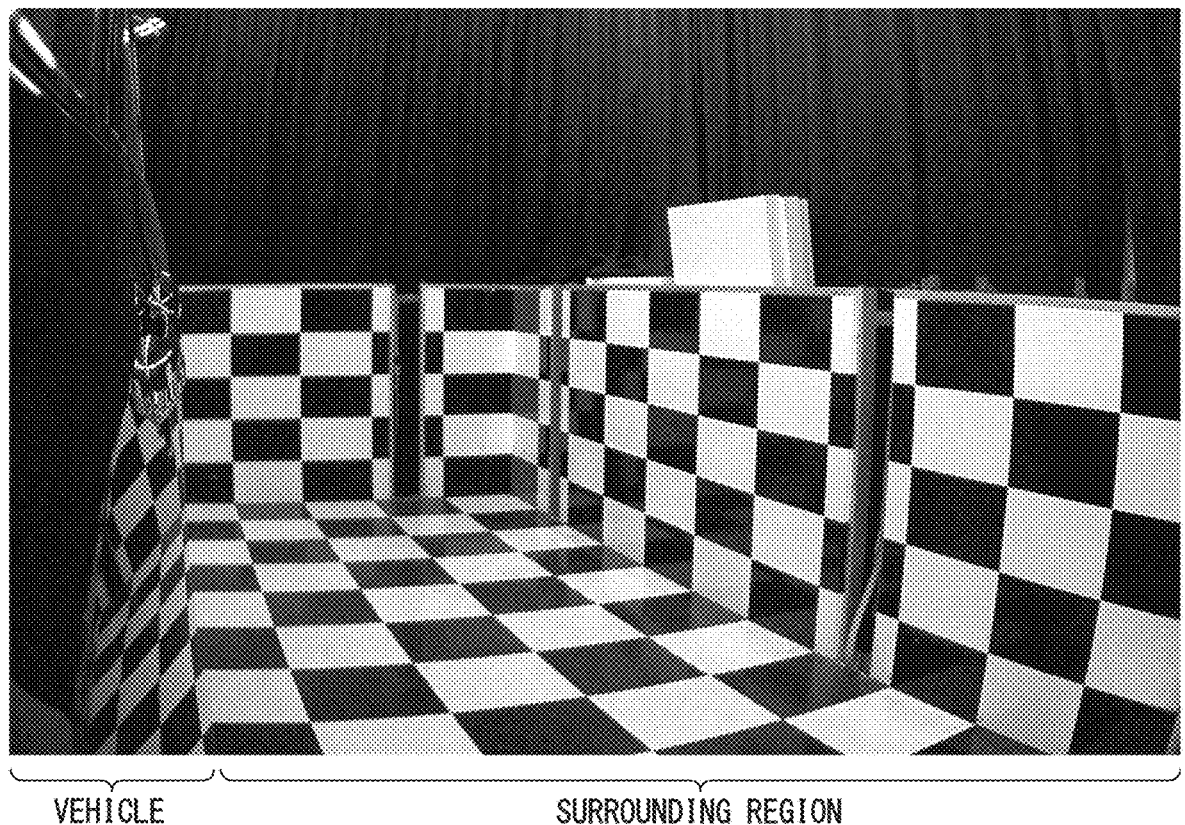
FIG. 3 is a diagram illustrating a video captured in an imaging device of FIG. 2.

Hereinafter, a process of setting the extraction range in the setting unit 70 will be described. FIG. 3 illustrates a video captured in the imaging device 10. Specifically, this video is obtained by imaging a left rear area of the vehicle C1 in the second imaging device 10b. This video is acquired by the acquirer 60. The description returns to FIG. 2. The input device 30 is installed in a door portion of the driver seat side of the vehicle C1, and is used as a device by which the user inputs an instruction. For example, the input device 30 includes a cross key, and the user inputs an instruction to move the extraction range in a predetermined direction by pushing down the cross key. The receiver 64 receives an instruction from the input device 30. This corresponds to receiving the instruction to move the extraction range for extracting at least a part of the first video acquired by the acquirer 60 in a predetermined direction. Here, the predetermined direction is assumed to be the right direction.

First to eighth techniques will be described here in order as the process of the processor 62 in a state where such an instruction is received.

(1) First Technique

Figure 4A:
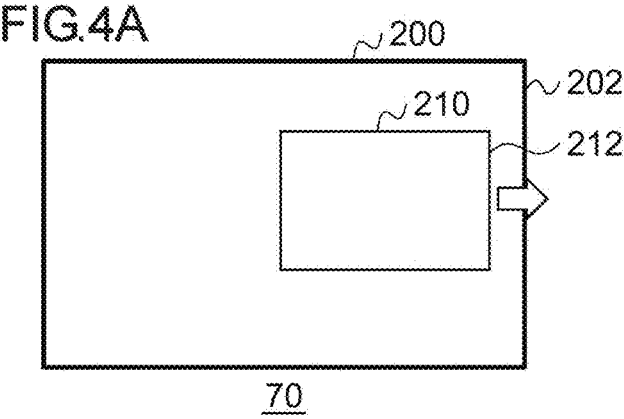
FIGS. 4A to 4H are diagrams illustrating an overview of a first technique by the video display system of FIG. 2.
Figure 4B:
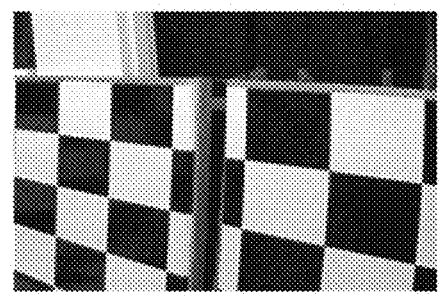

FIGS. 4A to 4H illustrate an overview of a first technique by the video display system 100. FIG. 4A illustrates a process in the setting unit 70. A right side of a video 200 received from the acquirer 60 is indicated by a video right end portion 202, and a right side of an extraction range 210 displayed on the display device 40 is indicated by an extraction range right end portion 212. The video 200 corresponds to the first video. Upon receiving an instruction to move the extraction range 210 in the right direction from the receiver 64, the setting unit 70 moves the extraction range 210 in the right direction as indicated by an arrow. The converter 72 outputs the video extracted by the extraction range 210 to the output unit 68 as the extracted video. FIG. 4B illustrates the extracted video in the extraction range 210 which is illustrated in FIG. 4A and displayed on the display device 40. In other words, the extracted video extracted by the extraction range 210 moved in accordance with the instruction received by the receiver 64 is displayed.

Figure 4C:
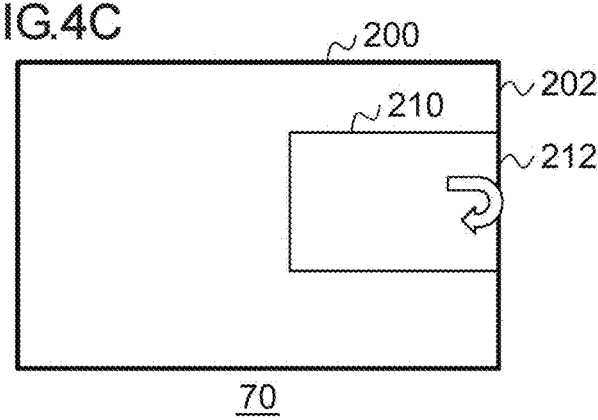
Figure 4D:
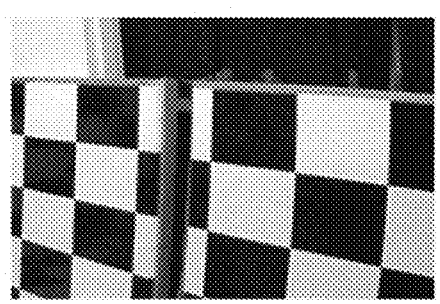

FIG. 4C illustrates a process subsequent to FIG. 4A. The setting unit 70 detects that the extraction range right end portion 212 of the extraction range 210 reaches the video right end portion 202 as the extraction range 210 is moved in the right direction. The reaching is detected when coordinates of the extraction range right end portion 212 and coordinates of the video right end portion 202 on an axis in the lateral direction coincide with each other, for example. FIG. 4D illustrates the extracted video in the extraction range 210 which is illustrated in FIG. 4C and displayed on the display device 40.

Figure 4E:
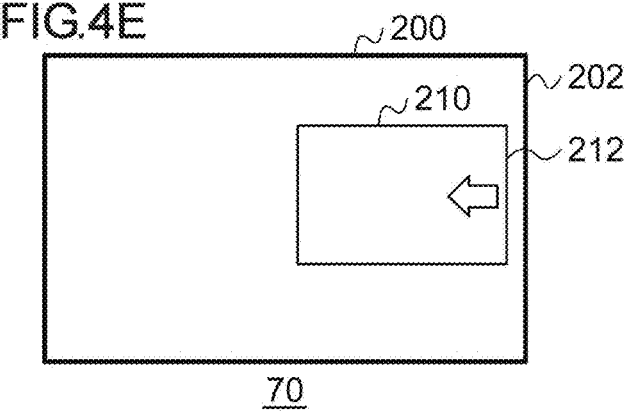
Figure 4F:
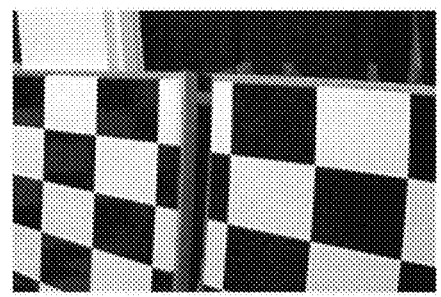

FIG. 4E illustrates a process subsequent to FIG. 4C. When detecting that the extraction range right end portion 212 of the extraction range 210 reaches the video right end portion 202, the setting unit 70 moves the extraction range 210 in a direction opposite to the predetermined direction, that is, the left direction. A distance of the movement in the left direction is decided in advance. FIG. 4F illustrates the extracted video in the extraction range 210 which is illustrated in FIG. 4E and displayed on the display device 40. It looks to the user as if the extracted video moves in the right direction, then bounces back, and moves in the left direction.

Figure 4G:
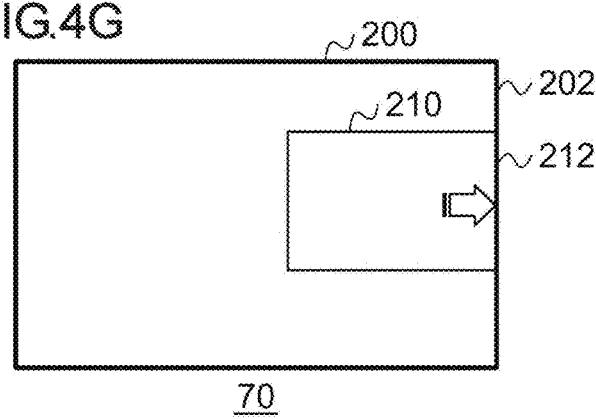
Figure 4H:
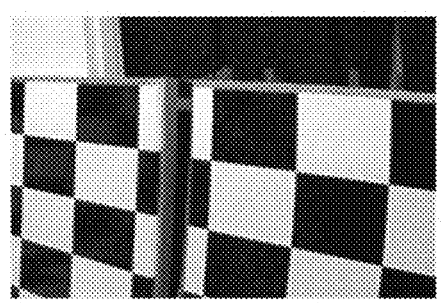

FIG. 4G illustrates a process subsequent to FIG. 4E. The setting unit 70 moves the extraction range 210 in the left direction by a predetermined distance and then returns the extraction range 210 in the right direction so that the extraction range right end portion 212 coincides with the video right end portion 202. The setting unit 70 decelerates the extraction range 210 in returning the extraction range 210 in the right direction. FIG. 4H illustrates the extracted video in the extraction range 210 which is illustrated in FIG. 4G and displayed on the display device 40. It looks to the user as if the extracted video moves by a predetermined distance in the left direction and then returns in the right direction.

As described above, in the first technique, when the instruction to move the extraction range 210 in the right direction is received even after the extraction range right end portion 212 reaches the video right end portion 202, the extraction range 210 is quickly returned in the left direction by a predetermined distance, and then the extraction range 210 is moved in the right direction. With such a process, a notification indicating that the extraction range 210 moved in accordance with the instruction received by the receiver 64 reaches the end portion of the video 200 is given. After such a process is performed, when the receiver 64 receives an instruction from the input device 30 (an instruction to move the extraction range 210 in the right direction), a similar processing is repeated. When the extraction range 210 is moved in the left direction by a predetermined distance and then returned in the right direction, the extraction range 210 may be moved at a constant speed or may be moved by a combination of acceleration and deceleration.

(2) Second Technique

Figure 5A:
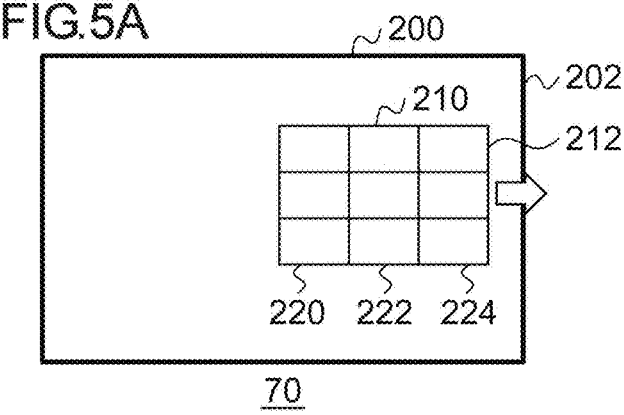
FIGS. 5A to 5H are diagrams illustrating an overview of a second technique by the video display system of FIG. 2.
Figure 5B:
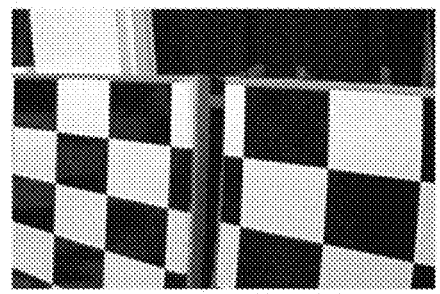

FIGS. 5A to 5H illustrate an overview of a second technique by the video display system 100. FIG. 5A illustrates a process in the setting unit 70. FIG. 5A is similar to FIG. 4A, but for the sake of simplicity of description, the extraction range 210 is divided into a plurality of blocks. The sizes of the respective blocks are equal. Here, three blocks on the left side are referred to as left blocks 220, three blocks in the center are referred to as central blocks 222, and three blocks on the right side are referred to as right blocks 224. Upon receiving an instruction to move the extraction range 210 in the right direction from the receiver 64, the setting unit 70 moves the extraction range 210 in the right direction as indicated by an arrow. The converter 72 outputs the video extracted by the extraction range 210 to the output unit 68 as the extracted video. At this time, the normal LUT is used. FIG. 5B illustrates the extracted video in the extraction range 210 which is illustrated in FIG. 5A and displayed on the display device 40. This is the same as in FIG. 4A.

Figure 5C:
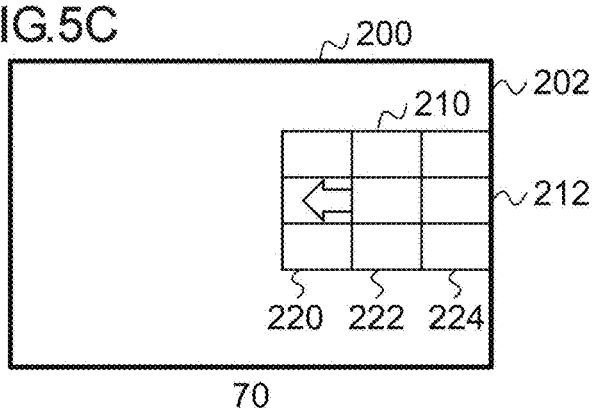
Figure 5D:
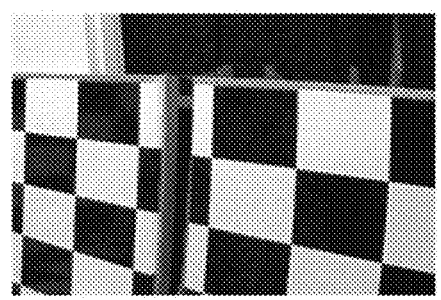

FIG. 5C illustrates a process subsequent to FIG. 5A. The setting unit 70 detects that the extraction range right end portion 212 of the extraction range 210 reaches the video right end portion 202 as the extraction range 210 is moved in the right direction. This process is similar to that in FIG. 4C. FIG. 5D illustrates the extracted video in the extraction range 210 which is illustrated in FIG. 5C and displayed on the display device 40.

Figure 5E:
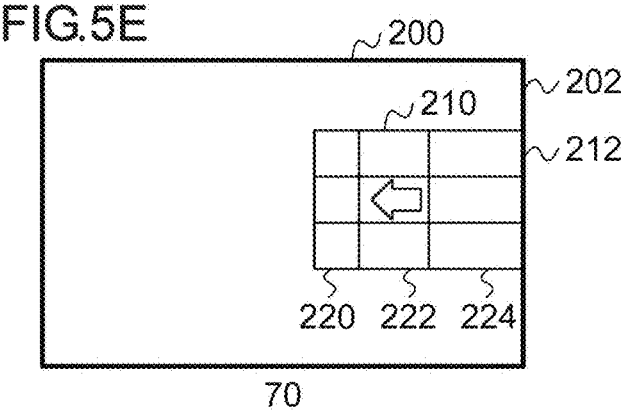

FIG. 5E illustrates a process subsequent to FIG. 5C. When detecting that the extraction range right end portion 212 of the extraction range 210 reaches the video right end portion 202, the setting unit 70 sets different magnification ratios in the lateral direction to the left blocks 220, the central block 222, and the right blocks 224 in the extraction range 210. Here, the magnification ratio of the left blocks 220 is set to be minimum, the magnification ratio of the right blocks 224 is set to be maximum, and the magnification ratio of the central blocks 222 is set to a value therebetween. Therefore, the blocks on the right side which is an original moving direction are enlarged, and the blocks on the left side opposite to the original moving direction are reduced. In other words, the setting unit 70 causes the magnification ratio in the lateral direction to be different between the video right end portion 202 side in the extraction range 210 and the opposite side to the video right end portion 202. In the setting of the magnification ratio of each block, it is adjusted so that an external dimension of the extraction range 210 is not changed.

Figure 5F:
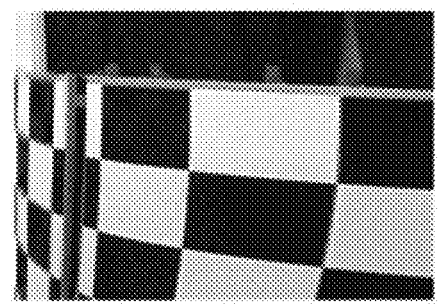

In order to generate the extracted video in which the magnification ratio in the lateral direction is changed in the left blocks 220, the central blocks 222, and the right blocks 224, the converter 72 uses an LUT for transformation (hereinafter referred to as "transformation LUT") stored in the non-volatile memory 66. Since a known technique may be used for the transformation LUT as well, description thereof is omitted here. In other words, the converter 72 performs switching from the normal LUT to the transformation LUT and then executes the process. FIG. 5F illustrates the extracted video in the extraction range 210 which is illustrated in FIG. 5E and displayed on the display device 40. It looks to the user as if the left side of extracted video is reduced, and the right side is extended. This extracted video is referred to as a third video.

Figure 5G:
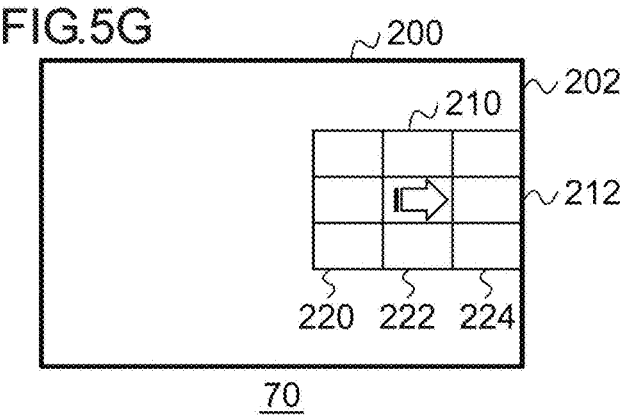

FIG. 5G illustrates a process subsequent to FIG. 5E. After setting the different magnification ratios in the lateral direction to the left blocks 220, the central blocks 222, and the right blocks 224, the setting unit 70 restores the magnification ratios in the lateral direction of the left blocks 220, the central blocks 222, and the right blocks 224 to the original ratios. Accordingly, the magnification ratios in the lateral direction of the left blocks 220, the central blocks 222, and the right blocks 224 are set to be equal.

Figure 5H:
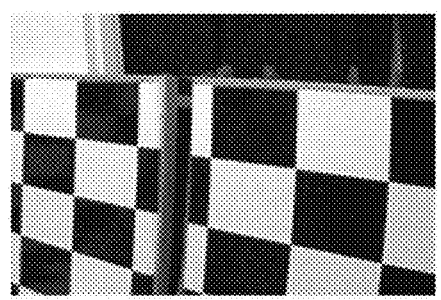

The converter 72 uses the normal LUT stored in the non-volatile memory 66 to generate the extracted video in which the magnification ratios in the lateral direction of the left blocks 220, the central blocks 222, and the right blocks 224 are restored. In other words, the converter 72 performs switching from the transformation LUT to the normal LUT and then executes the process. FIG. 5H illustrates the extracted video in the extraction range 210 which is illustrated in FIG. 5G and displayed on the display device 40. It looks to the user as if the left side of the extracted video is reduced in the lateral direction, the right side is extended in the lateral direction, and then they are restored to the original state. In addition to using the transformation LUT, the normal LUT may be morphed to give effects similar to the transformation LUT. This extracted video is referred to as a fourth video.

As described above, in the second technique, when the instruction to move the extraction range 210 in the right direction is received even after the extraction range right end portion 212 reaches the video right end portion 202, the video on the left side of the extraction range 210 is compressed by a certain amount and displayed for a certain period of time, and the video on the right side is enlarged by a certain amount and displayed for a certain period of time. This intuitively indicates that the video is unable to be adjusted anymore by an expression of moving a certain video having elasticity and restoring it.

(3) Third Technique

Figure 6A:
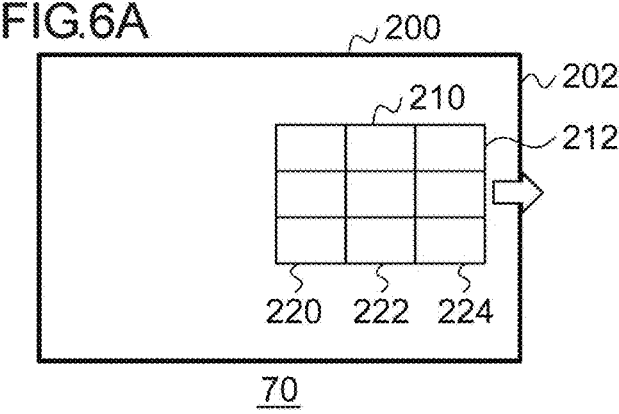
FIGS. 6A to 6H are diagrams illustrating an overview of a third technique by the video display system of FIG. 2.
Figure 6B:
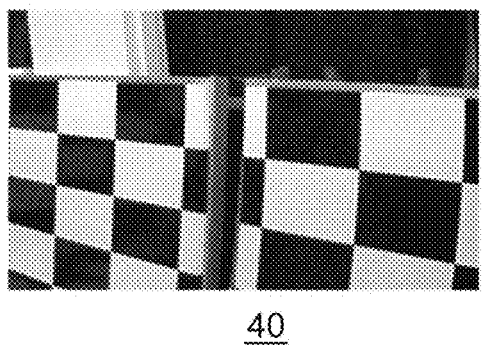
Figure 6C:
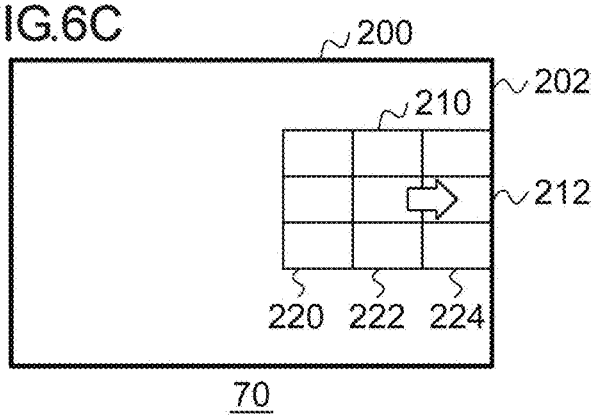
Figure 6D:
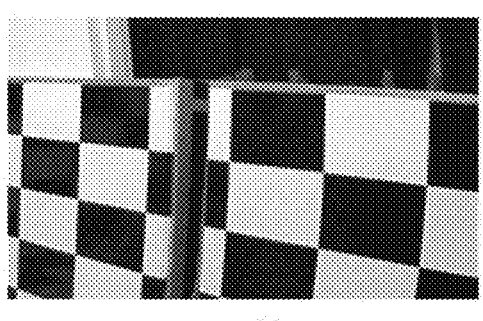
Figure 6E:
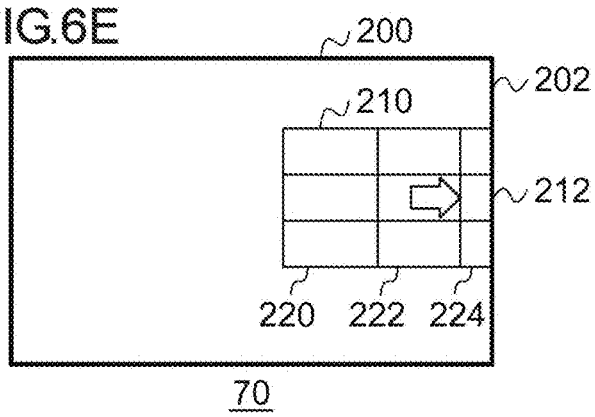

FIGS. 6A to 6H illustrate an overview of a third technique by the video display system 100. FIGS. 6A to 6D are the same as FIGS. 5A to 5D. FIG. 6E illustrates a process subsequent to FIG. 6C. When detecting that the extraction range right end portion 212 of the extraction range 210 reaches the video right end portion 202, the setting unit 70 sets different magnification ratios in the lateral direction to the left blocks 220, the central blocks 222, and the right blocks 224 in the extraction range 210. Here, the magnification ratio of the right blocks 224 is set to be minimum, the magnification ratio of the left blocks 220 is set to be maximum, and the magnification ratio of the central blocks 222 is set to a value therebetween. Therefore, the blocks on the left side which is opposite to the original moving direction are enlarged, and the blocks on the right side which is the original moving direction are reduced. In other words, the setting unit 70 causes the magnification ratio in the lateral direction to be different between the video right end portion 202 side in the extraction range 210 and the opposite side to the video right end portion 202.

Figure 6F:
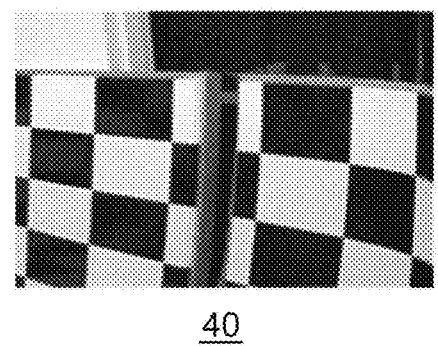

The process in the converter 72 is similar to that in the second technique, but the transformation LUT stored in the non-volatile memory 66 is different from that in the second technique. Here, the converter 72 performs switching from the normal LUT to the transformation LUT and then executes the process. FIG. 6F illustrates the extracted video in the extraction range 210 which is illustrated in FIG. 6E and displayed on the display device 40. It looks to the user as if the right side of the extracted video is reduced, and the left side is extended. This extracted video is referred to as a third video.

Figure 6G:
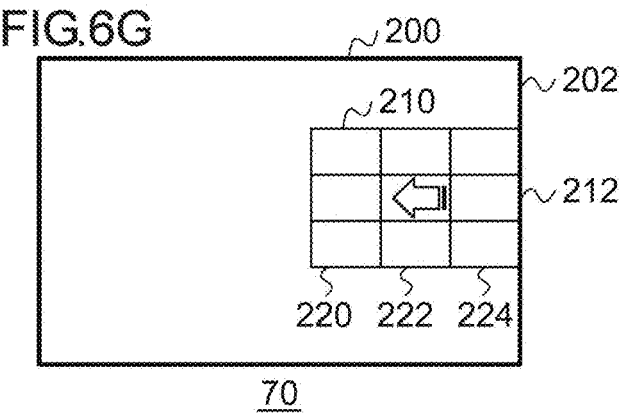

FIG. 6G illustrates a process subsequent to FIG. 6E. The setting unit 70 sets different magnification ratios in the lateral direction to the left blocks 220, the central blocks 222, and the right blocks 224, and then restores the magnification ratios in the lateral direction of the left blocks 220, the central blocks 222, and the right blocks 224 to the original ratios. Accordingly, the magnification ratios in the lateral direction of the left blocks 220, the central blocks 222, and the right blocks 224 are set to be equal.

Figure 6H:
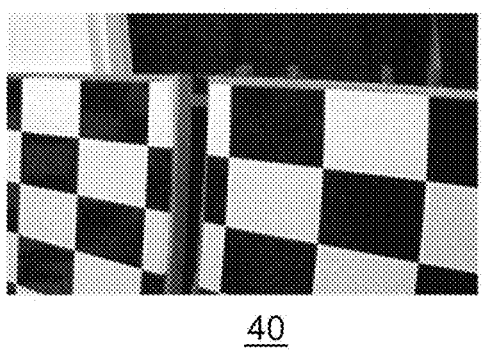

The converter 72 uses the normal LUT stored in the non-volatile memory 66 to generate the extracted video in which the magnification ratios in the lateral direction of the left blocks 220, the central blocks 222, and the right blocks 224 are restored. In other words, the converter 72 performs switching from the transformation LUT to the normal LUT and then executes the process. FIG. 6H illustrates the extracted video in the extraction range 210 which is illustrated in FIG. 6G and displayed on the display device 40. It looks to the user as if the right side of the extracted video is reduced in the lateral direction, the left side is extended in the lateral direction, and then they are restored to the original state. This extracted video is referred to as a fourth video.

As described above, in the third technique, when the instruction to move the extraction range 210 in the right direction is received even after the extraction range right end portion 212 reaches the video right end portion 202, the video on the right side of the extraction range 210 is compressed by a certain amount and displayed for a certain period of time, and the video on the left side is enlarged by a certain amount and displayed for a certain period of time. This also intuitively indicates that the video is unable to be adjusted anymore by an expression in which a certain video having elasticity is to be moved but is restored.

(4) Fourth Technique

Figure 7A:
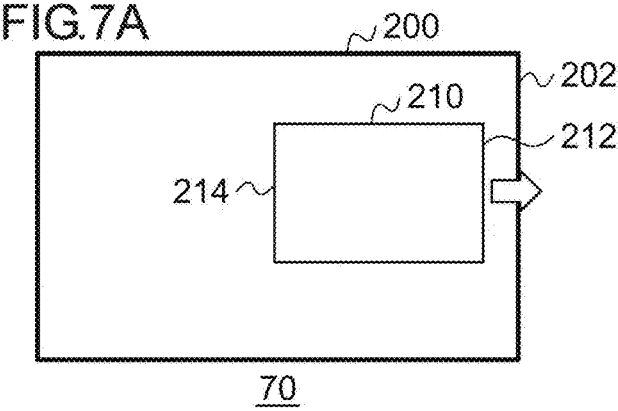
FIGS. 7A to 7H are diagrams illustrating an overview of a fourth technique by the video display system of FIG. 2.
Figure 7B:
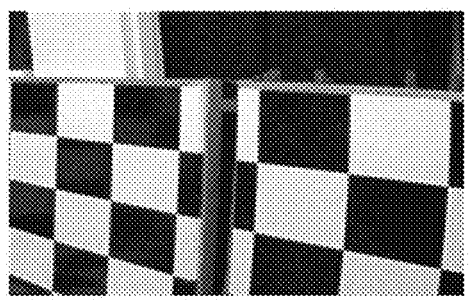

FIGS. 7A to 7H illustrate an overview of a fourth technique by the video display system 100. FIG. 7A illustrates a process in the setting unit 70. FIG. 7A is similar to FIG. 4A. A left side of the extraction range 210 is indicated by an extraction range left end portion 214. Upon receiving an instruction to move the extraction range 210 in the right direction from the receiver 64, the setting unit 70 moves the extraction range 210 in the right direction as indicated by an arrow. The converter 72 outputs the video extracted by the extraction range 210 to the output unit 68 as the extracted video. At this time, the normal LUT is used. FIG. 7B illustrates the extracted video in the extraction range 210 which is illustrated in FIG. 7A and displayed on the display device 40. This is the same as in FIG. 4A.

Figure 7C:
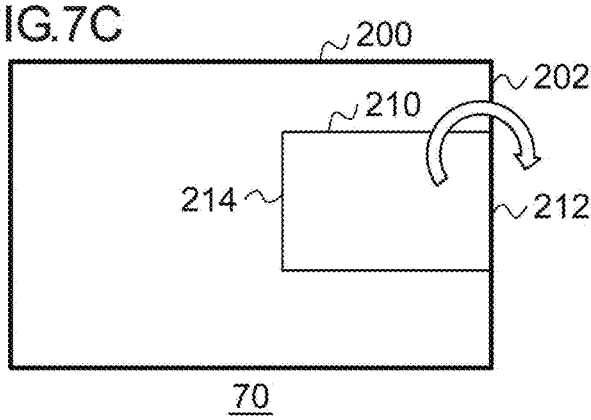
Figure 7D:
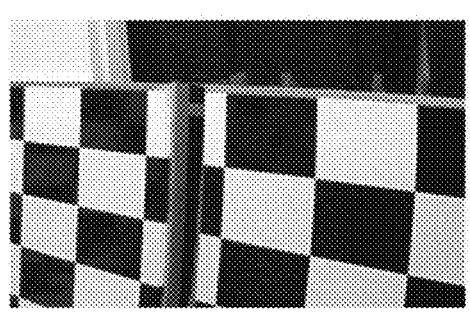

FIG. 7C illustrates a process subsequent to FIG. 7A. The setting unit 70 detects that the extraction range right end portion 212 of the extraction range 210 reaches the video right end portion 202 as the extraction range 210 is moved in the right direction. This process is similar to that in FIG. 4C. FIG. 7D illustrates the extracted video in the extraction range 210 which is illustrated in FIG. 7C and displayed on the display device 40.

Figure 7E:
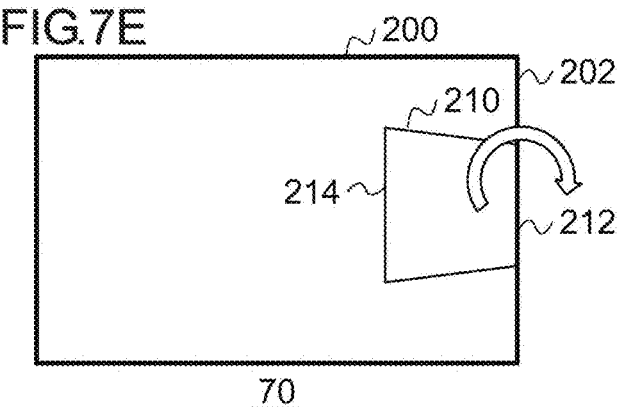

FIG. 7E illustrates a process subsequent to FIG. 7C. When detecting the reaching, the setting unit 70 causes a magnification ratio in a longitudinal direction to be different between the extraction range right end portion 212 side and the extraction range left end portion 214 side in the extraction range 210. Here, the magnification ratio of the extraction range left end portion 214 side is increased, and the magnification ratio of the extraction range right end portion 212 side is decreased. Further, the magnification ratio in the lateral direction in the extraction range 210 is changed, and the extraction range 210 is compressed and reduced in the lateral direction on the basis of the extraction range right end portion 212 side. Accordingly, the extraction range 210 is rotated so that the extraction range left end portion 214 side moves forward using the extraction range right end portion 212 as an axis.

Figure 7F:
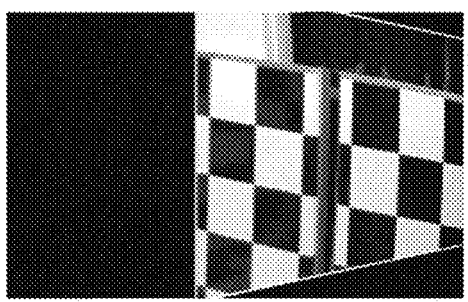

The converter 72 causes the magnification ratio in the longitudinal direction to be different between the extraction range right end portion 212 side and the extraction range left end portion 214 side, and uses the transformation LUT stored in the non-volatile memory 66 to generate the extracted video in which the magnification ratio in the lateral direction is changed on the basis of the extraction range right end portion 212 side. Further, content of the transformation LUT is different from that of the second and the third techniques. The converter 72 performs switching from the normal LUT to the transformation LUT and then executes the process. FIG. 7F illustrates the extracted video in the extraction range 210 which is illustrated in FIG. 7E and displayed on the display device 40. It looks to the user as if the left side of the extracted video approaches, and the right side gets away. Further, reference destination coordinates of the LUT may undergo angle correction through projective transformation by morphing. This corresponds to performing a process of generating one equivalent to the transformation LUT by a CPU on the basis of the normal LUT. This extracted video is referred to as a third video.

Figure 7G:
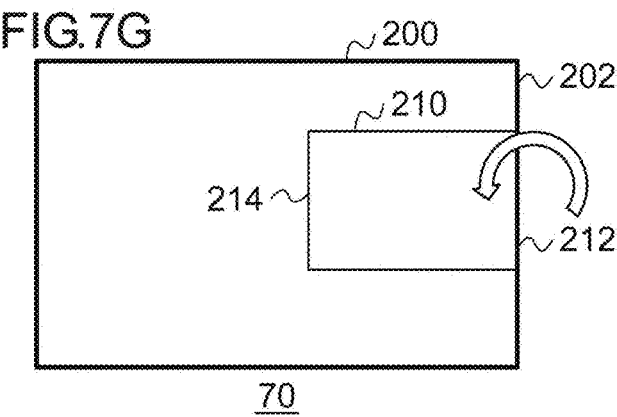

FIG. 7G illustrates a process subsequent to FIG. 7E. The setting unit 70 causes the magnification ratio in the longitudinal direction to be different between the extraction range right end portion 212 side and the extraction range left end portion 214 side and then restores the magnification ratio in the extraction range right end portion 212 to the original ratio. Further, the setting unit 70 causes the magnification ratio in the lateral direction to be changed on the basis of the extraction range right end portion 212 side, and then restores the magnification ratio in the lateral direction based on the extraction range right end portion 212 side to the original ratio. Accordingly, the magnification ratio in the longitudinal direction of the extraction range right end portion 212 side becomes equal to the magnification ratio of the extraction range left end portion 214 side, and a lateral dimension of the extraction range 210 is restored to an original size.

Figure 7H:
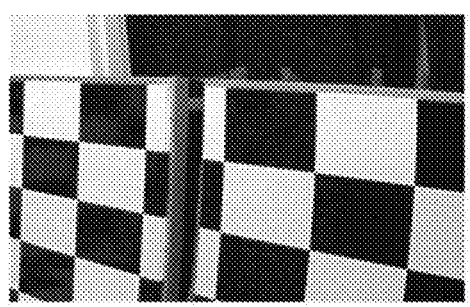

The converter 72 restores the magnification ratios in the longitudinal direction of the extraction range right end portion 212 side and the extraction range left end portion 214 side and uses the normal LUT stored in the non-volatile memory 66 to generate the extracted video in which the magnification ratio in the lateral direction is restored on the basis of the extraction range right end portion 212 side. In other words, the converter 72 performs switching from the transformation LUT to the normal LUT and then executes the process. FIG. 7H illustrates the extracted video in the extraction range 210 which is illustrated in FIG. 7G and displayed on the display device 40. It looks to the user as if the left side of the extracted video approaches, and the right side gets away, and then they are restored to the original state. This extracted video is referred to as a fourth video.

As described above, in the fourth technique, when the instruction to move the extraction range 210 in the right direction is received even after the extraction range right end portion 212 reaches the video right end portion 202, the video of the left side of the extraction range 210 is enlarged to approach, and the video of the right side is inclined to recede from view. This intuitively indicates that the video is unable to be adjusted anymore by an expression of inclining the video.

(5) Fifth Technique

Figure 8A:
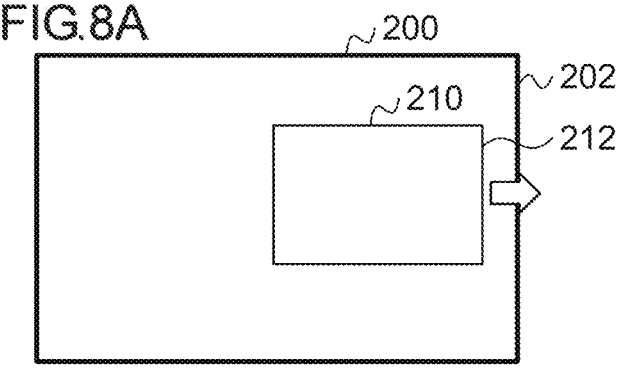
FIGS. 8A to 8H are diagrams illustrating an overview of a fifth technique by the video display system of FIG. 2.
Figure 8B:
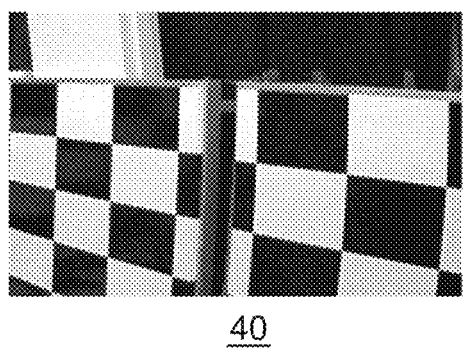

FIGS. 8A to 8H illustrate an overview of a fifth technique by the video display system 100. FIG. 8A illustrates a process in the setting unit 70. FIG. 8A is similar to FIG. 4A. Upon receiving an instruction to move the extraction range 210 in the right direction from the receiver 64, the setting unit 70 moves the extraction range 210 in the right direction as indicated by an arrow. The converter 72 outputs the video extracted by the extraction range 210 to the output unit 68 as the extracted video. FIG. 8B illustrates the extracted video in the extraction range 210 which is illustrated in FIG. 8A and displayed on the display device 40. This is the same as in FIG. 4A.

Figure 8C:
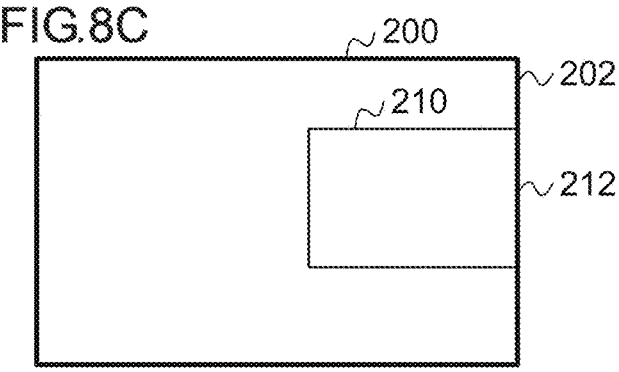
Figure 8D:
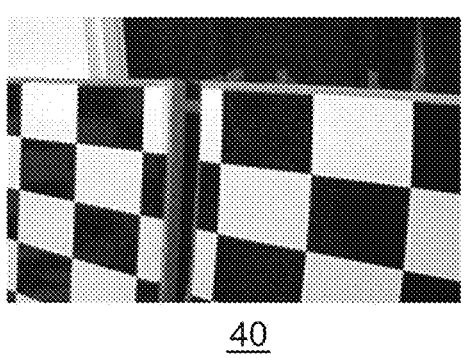

FIG. 8C illustrates a process subsequent to FIG. 8A. The setting unit 70 detects that the extraction range right end portion 212 of the extraction range 210 reaches the video right end portion 202 as the extraction range 210 is moved in the right direction. This process is similar to that in FIG. 4C. FIG. 8D illustrates the extracted video in the extraction range 210 which is illustrated in FIG. 8C and displayed on the display device 40.

Figure 8E:
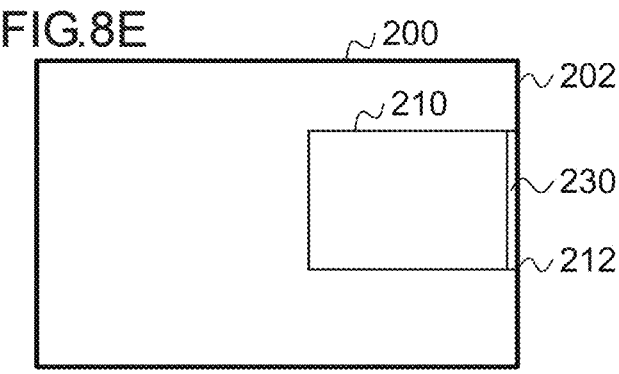
Figure 8F:
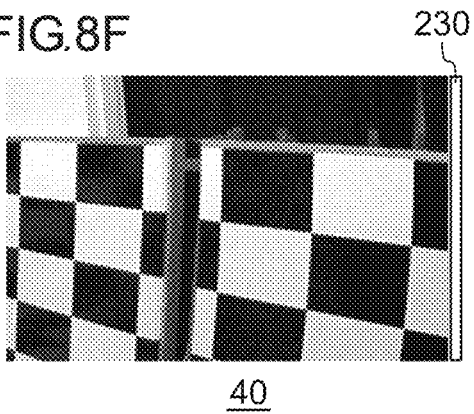

FIG. 8E illustrates a process subsequent to FIG. 8C. When detecting that the extraction range right end portion 212 of the extraction range 210 reaches the video right end portion 202, the setting unit 70 sets an indicator 230 in a part of the extraction range 210. For example, the indicator 230 is set by being superimposed on the extraction range right end portion 212 side in the direction in which the extraction range 210 is originally moved using a straight line bar distinguishable from the extracted video at first glance. FIG. 8F illustrates the extracted video in the extraction range 210 which is illustrated in FIG. 8E and displayed on the display device 40. Here, the indicator 230 is displayed for a certain period of time to light up or blink.

Figure 8G:
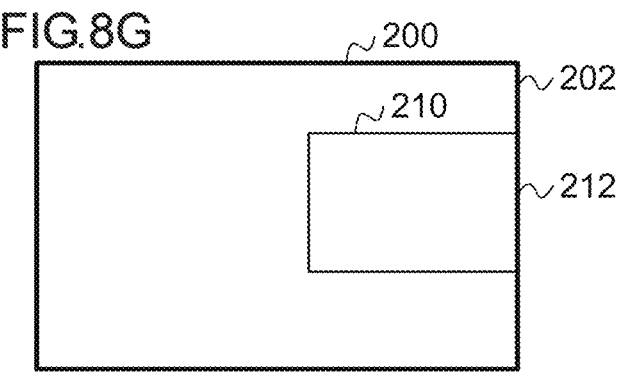
Figure 8H:
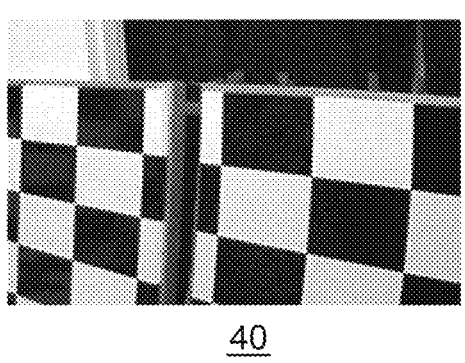

FIG. 8G illustrates a process subsequent to FIG. 8E. The setting unit 70 erases the indicator 230 set in the extraction range 210. FIG. 8H illustrates the extracted video in the extraction range 210 which is illustrated in FIG. 8G and displayed on the display device 40. It looks to the user as if the indicator 230 lights up or blinks, and then the indicator 230 disappears.

As described above, in the fifth technique, when the instruction to move the extraction range 210 in the right direction is received even after the extraction range right end portion 212 reaches the video right end portion 202, the indicator 230 set in the direction in which the extraction range 210 is moved is displayed to light up or blink for a certain period of time. This intuitively indicates that the video is unable to be adjusted anymore by an indicator expression.

(6) Sixth Technique

Figure 9A:
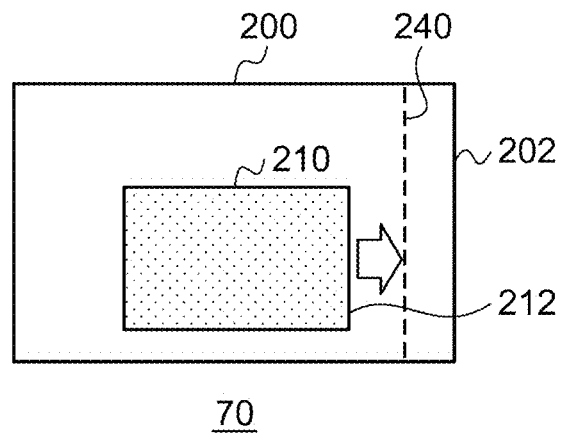
FIGS. 9A to 9C are diagrams illustrating an overview of a sixth technique by the video display system of FIG. 2.
Figure 9B:
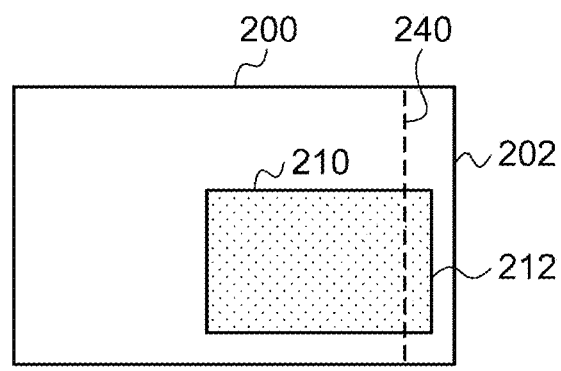
Figure 9C:
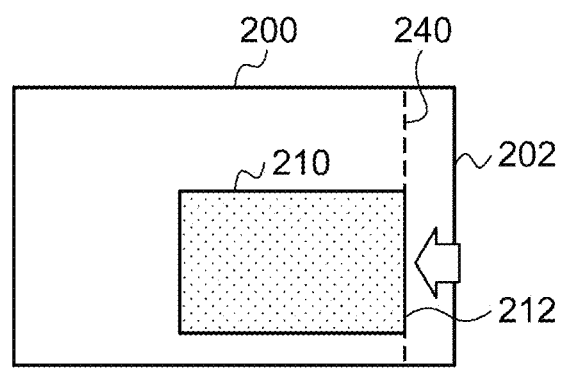

FIGS. 9A to 9C illustrate an overview of a sixth technique by the video display system 100. FIG. 9A illustrates a process in the setting unit 70. FIG. 9A is similar to FIG. 4A, but when the extraction range 210 is moved in the right direction, a pseudo boundary 240 is set before the video right end portion 202, that is, on the left side. Upon receiving an instruction to move the extraction range 210 in the right direction from the receiver 64, the setting unit 70 moves the extraction range 210 in the right direction as indicated by an arrow. The converter 72 outputs the video extracted by the extraction range 210 to the output unit 68 as the extracted video.

FIG. 9B illustrates a process subsequent to FIG. 9A. The setting unit 70 detects that the extraction range right end portion 212 of the extraction range 210 reaches the pseudo boundary 240 as the extraction range 210 is moved in the right direction. The reaching is detected when coordinates of the extraction range right end portion 212 and coordinates of the pseudo boundary 240 on an axis in the lateral direction coincide with each other, for example. When an instruction to further move the extraction range 210 in the right direction is received from the receiver 64 after the reaching is detected, the setting unit 70 moves the extraction range 210 toward the video right end portion 202, that is, in the right direction beyond the pseudo boundary 240. A moving distance in the right direction is decided to a predetermined distance before reaching the video right end portion 202 in advance.

FIG. 9C illustrates a process subsequent to FIG. 9B. The setting unit 70 moves the extraction range 210 in the left direction by a predetermined distance and then returns the extraction range 210 in the right direction so that the extraction range right end portion 212 coincides with the pseudo boundary 240. The setting unit 70 decelerates the extraction range 210 in returning the extraction range 210 in the left direction.

As described above, in the sixth technique, when the instruction to move the extraction range 210 in the right direction is received even after the extraction range right end portion 212 reaches the pseudo boundary 240, the extraction range 210 is moved in the right direction by a predetermined distance at a constant speed, and then the extraction range 210 is quickly moved in the left direction. As described above, a notification indicating that the extraction range 210 moved in accordance with the instruction received by the receiver 64 approaches the end portion of the video 200 is given.

(7) Seventh Technique

In the above example, when the extraction range right end portion 212 reaches the video right end portion 202 or the pseudo boundary 240, the notification indicating the reaching is given by changing the display of the extracted video. The processor 62 may instruct the output unit 68 to output a sound, for example, an electronic sound when the setting unit 70 detects that the extraction range right end portion 212 reaches the video right end portion 202 or the pseudo boundary 240. Upon receiving the instruction, the output unit 68 outputs an instruction signal for causing an electronic sound to be output from the speaker 50. Upon receiving the instruction signal from the output unit 68, the speaker 50 outputs an electronic sound. Such a notification by the electronic sound may be used instead of the notification by display or may be performed together with the notification by display.

(8) Eighth Technique

In the above example, when the extraction range right end portion 212 reaches the video right end portion 202 or the pseudo boundary 240, the notification indicating the reaching is given by changing the display of the extracted video or outputting the electronic sound. The processor 62 may instruct the output unit 68 to cause the input device 30 to vibrate when the setting unit 70 detects that the extraction range right end portion 212 reaches the video right end portion 202 or the pseudo boundary 240. Upon receiving the instruction, the output unit 68 outputs an instruction signal for causing a motor installed in the input device 30 to vibrate. Upon receiving the instruction signal from the output unit 68, the input device 30 vibrates the motor installed therein. The processor 62 may instruct the output unit 68 to cause the input device 30 to light up when the setting unit 70 detects that the extraction range right end portion 212 reaches the video right end portion 202 or the pseudo boundary 240. Upon receiving the instruction, the output unit 68 outputs an instruction signal for causing a light emitting unit installed in the input device 30 to be turned on. Upon receiving the instruction signal from the output unit 68, the input device 30 causes a light emitting unit installed in the cross key of the input device 30 to be turned on. The notifications using the input device 30 may be performed instead of the notification by the display or the electronic sound or may be performed together with the notification by the display or the electronic sound.

In terms of hardware, this configuration can be realized by a CPU, a memory, or other LSIs of an arbitrary computer, and in terms of software, this configuration can be realized by a program which is loaded onto a memory or the like, but functional blocks implemented by combination thereof are illustrated herein. Therefore, those skilled in the art would understand that the functional blocks can be realized in various forms by only hardware or a combination of hardware and software.

Figure 10:
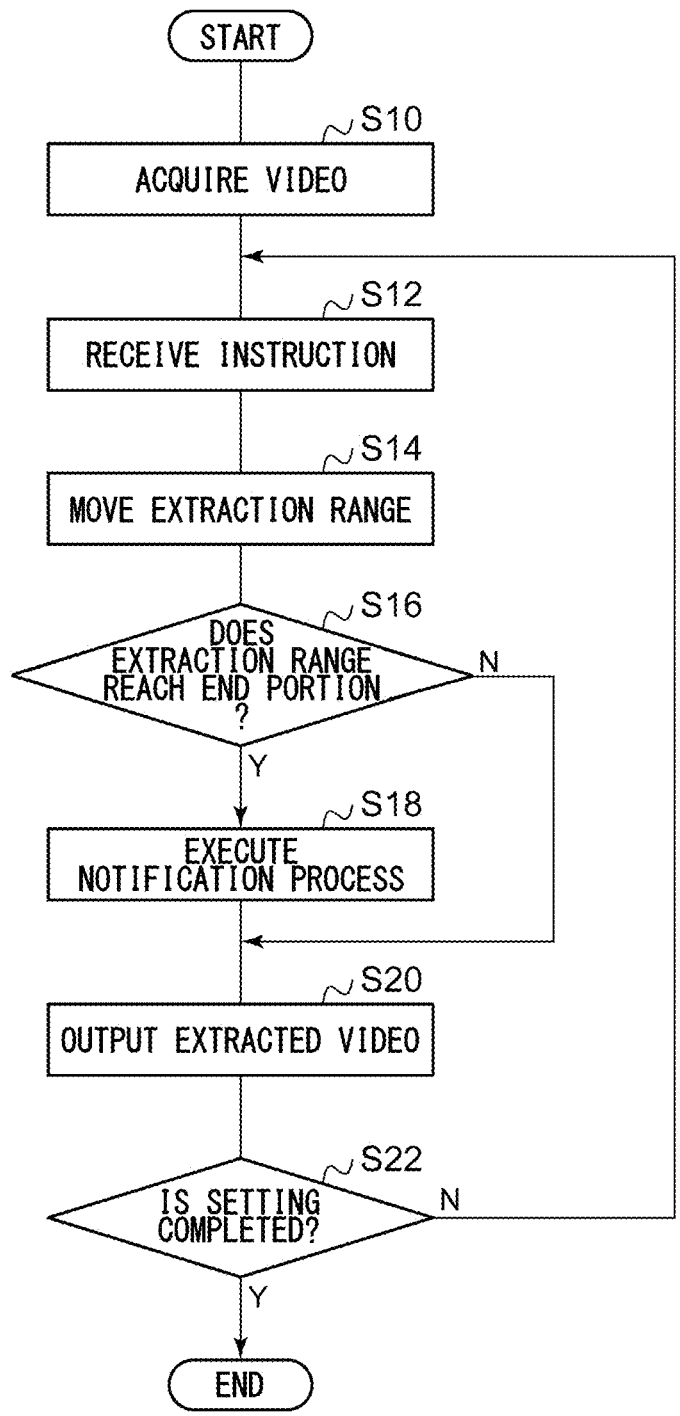
FIG. 10 is a flowchart illustrating a processing procedure by the video display system of FIG. 2.

An operation of the video display system 100 having the above configuration will be described. FIG. 10 is a flowchart illustrating a processing procedure by the video display system 100. The acquirer 60 acquires the video 200 from the imaging device 10 (S10). The receiver 64 receives an instruction from the input device 30 (S12). In accordance with the instruction received by the receiver 64, the setting unit 70 moves the extraction range 210 to be displayed on the display device 40 in the video 200 (S14). When the extraction range 210 reaches the end portion of the video 200 (Y in S16), the setting unit 70 and the converter 72 execute a notification process for giving a notification indicating that the extraction range reaches the end portion (S18). When the extraction range 210 does not reach the end portion of the video 200 (N of S16), step 18 is skipped. The output unit 68 outputs the extracted video to the display device 40 (S20). If the setting of the extraction range 210 is not completed (N of S22), the process returns to step 12. When the setting of the extraction range 210 is completed (Y of S22), the process ends.

According to the present embodiment, when the extraction range displayed on the display device reaches the end portion of the first video serving as the process target, the notification indicating the reaching is given, and thus it is possible to give a notification indicating that the extraction range reaches the end portion of the first video. Further, since the notification indicating that the extraction range reaches the end portion of the first video is given, it is possible to cause the user to recognize whether or not it is possible to further move the extraction range or whether or not the device has a failure. Further, since the user is caused to recognize whether or not the extraction range is unable to be moved anymore or whether the device has a failure, it is possible to improve maneuverability of the user. Further, after the extraction range is moved in a direction opposite to a predetermined direction, the extraction range is moved in a predetermined direction, and the extraction range is returned to the end portion of the first video, and thus it is possible to give a notification indicating that the extraction range reaches the end portion of the first video. Further, after the third video in which the magnification ratio in a predetermined direction is changed to be different between the side of the end portion of the first video and the side opposite to the end portion of the first video in the extraction range, the fourth video in which the magnification ratio in the extraction range is restored to the original ratio is output, and thus it is possible to give the notification indicating that the extraction range reaches the end portion of the first video.

Further, after the magnification ratio in a direction different from a predetermined direction is changed to be different between the side of the end portion of the first video and the side opposite to the end portion of the first video in the extraction range, and the third video in which the magnification ratio in the predetermined direction is changed on the basis of the side of the end portion of the first video is output, the fourth video in which each magnification ratio in the extraction range is restored to the original ratio is output, and thus it is possible to give the notification indicating that the extraction range reaches the end portion of the first video. Further, since the indicator is lighted up on or blinked, it is possible to give the notification indicating that the extraction range reaches the end portion of the first video. Further, after the extraction range is moved toward the end portion of the first video beyond the pseudo boundary, the extraction range is returned to the pseudo boundary, and thus it is possible to give the notification indicating that the extraction range almost reaches the end portion of the first video.

An overview of one embodiment of the present disclosure is as follows. A display control device according to one embodiment of the present disclosure is a display control device that is installed in a vehicle and causes a video of an area around the vehicle from an imaging device to be displayed on a display device, and comprises an acquirer that acquires a first video serving as a processing target from the imaging device, a receiver that receives an instruction to move an extraction range for extracting at least a part of the first video acquired by the acquirer, and an output unit that outputs a second video extracted in the extraction range moved in accordance with the instruction received by the receiver to the display device. When the extraction range moved in accordance with the instruction received by the receiver reaches an end portion of the first video, the output unit gives a notification indicating the reaching.

According to one embodiment, when the extraction range reaches the end portion of the first video, the notification indicating the reaching is given, and thus it is possible to give the notification indicating that the extraction range reaches the end portion of the first video.

The receiver receives an instruction to move the extraction range in a predetermined direction, and when the extraction range moved in the predetermined direction reaches the end portion of the first video, the output unit moves the extraction range in a direction opposite to the predetermined direction and then moves the extraction range in the predetermined direction, and returns the extraction range to the end portion of the first video. In this case, after the extraction range is moved in the direction opposite to the predetermined direction, the extraction range is moved in a predetermined direction, and the extraction range is returned to the end portion of the first video, and thus it is possible to give the notification indicating that the extraction range reaches the end portion of the first video.

The receiver may receive an instruction to move the extraction range in a predetermined direction, and when the extraction range moved in the predetermined direction reaches the end portion of the first video, the output unit may output a third video in which a magnification ratio in a predetermined direction is changed to be different between a side of the end portion of the first video in the extraction range and a side opposite to the end portion of the first video and then output a fourth video in which the magnification ratio in the extraction range is restored to an original ratio. In this case, after the third video in which the magnification ratio in the predetermined direction is changed to be different between the side of the end portion of the first video and the side opposite thereto in the extraction range, the fourth video in which the magnification ratio is restored to the original ratio, and thus it is possible to give the notification indicating that the extraction range reaches the end portion of the first video.

The receiver may receive an instruction to move the extraction range in a predetermined direction, and when the extraction range moved in the predetermined direction reaches the end portion of the first video, the output unit may output a third video in which a magnification ratio in a direction different from the predetermined direction to be different between a side of the end portion of the first video in the extraction range and a side opposite to the end portion of the first video, and in which the magnification ratio in the predetermined direction is changed on the basis of the side of the end portion of the first video, and then output a fourth video in which the magnification ratio in the extraction range is restored to an original ratio. In this case, after the third video in which the magnification ratio in the direction different from the predetermined direction is changed to be different between the side of the end portion of the first video in the extraction range and the side opposite thereto, the fourth video in which the magnification ratio is restored to the original ratio is output, and thus it is possible to give the notification indicating that the extraction range reaches the end portion of the first video.

The receiver receives an instruction to move the extraction range in a predetermined direction, and when the extraction range moved in the predetermined direction reaches a preset pseudo boundary before the end portion of the first video, the output unit may move the extraction range toward the end portion of the first video beyond the pseudo boundary and then return the extraction range to the pseudo boundary. In this case, after the extraction range is moved toward the end portion of the first video beyond the pseudo boundary, the extraction range is returned to the pseudo boundary, and thus it is possible to give the notification indicating that the extraction range almost reaches the end portion of the first video.

The embodiment of the present disclosure has been described above. It would be understood by those skilled in the art that the embodiment is an example, various modifications can be made by combinations of the respective components or the respective processes, and the modifications are included in the scope of the present disclosure.

In the present embodiment, the receiver 64 receives the instruction to move the extraction range 210 in the right direction. However, the present embodiment is not limited thereto, and for example, the receiver 64 may receive an instruction to move the extraction range 210 in the left direction, the upward direction, or the downward direction. In this case, the processor 62 executes the above-described process when the end portion of the video 200 approaching as the extraction range 210 is moved coincides with the end portion of the extraction range 210. Further, the above-described process may be executed in a state where the pseudo boundary 240 is set before an end portion of the video 200 in a direction in which the extraction range 210 is moved. Further, the above-described process may be executed not only when the extraction range 210 is moved upward, downward, leftward, or rightward but also when the extraction range 210 is enlarged. According to the present modified example, the range of application of the embodiment can be expanded.

In the present embodiment, when the extraction range displayed on the display device reaches the end portion of the video using the video of the area around the vehicle captured by the imaging device 10 (the first imaging device 10a and the second imaging device 10b) attached to the side mirror C2 (the right side mirror C2a and the left side mirror C2b) of the vehicle C1 as the video serving as the process target, the notification indicating the reaching is given. However, the present embodiment is not limited thereto, and for example, the process may be performed using a video of an area behind the vehicle captured by an imaging device attached to a back door or the like of the rear part of the vehicle C1. Alternatively, the process may be performed using a video of an area in front of the vehicle captured by an imaging device attached to a front grill or the like in the front of the vehicle C1. An electronic mirror display serving as a rearview mirror, a display of a navigation system, an instrument panel display, or the like is used as the display device 40.

Figure 11:
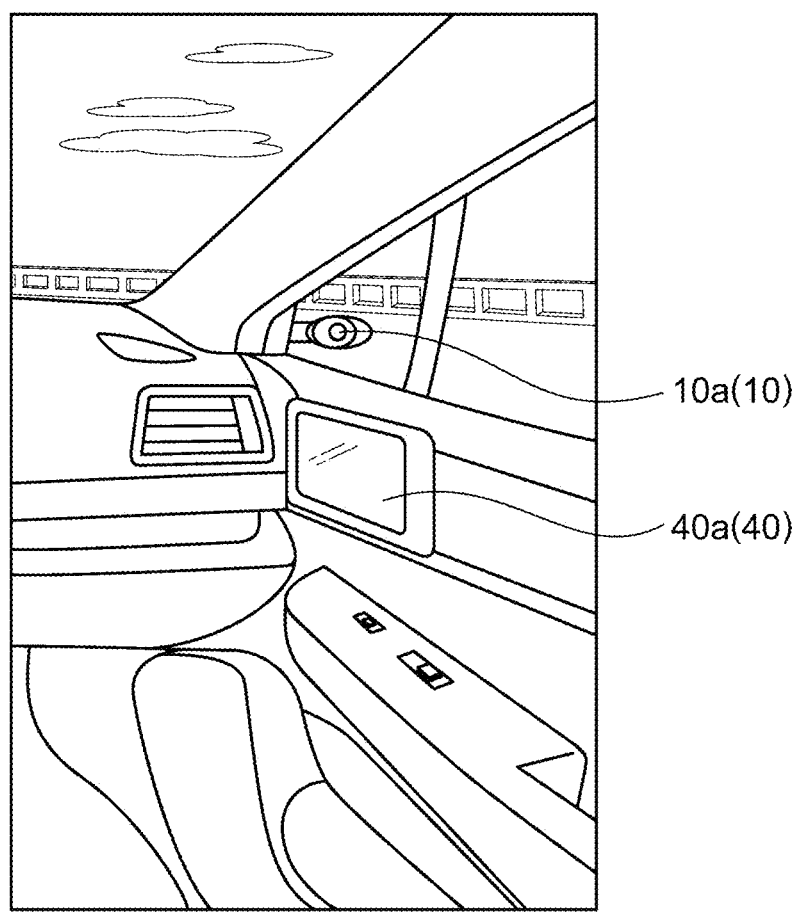
FIG. 11 is a diagram schematically illustrating another configuration of a vehicle in an embodiment.

In the present embodiment, the imaging device 10 and the display device 40 are installed in the side mirror C2 as illustrated in FIG. 1B. However, the imaging device 10 and the display device 40 may be arranged separately. FIG. 11 schematically illustrates another configuration of the vehicle C1 in an embodiment. As illustrated in FIG. 11, the imaging device 10 is installed on an outer side of the vehicle C1, and the display device 40 is installed on an inner side of the vehicle C1. Since the imaging device 10 and the display device 40 are installed separately as described above, it is possible to minimize the imaging device 10 on the outer side of the vehicle. Accordingly, design is improved. Further, air resistance is suppressed, and fuel economy can be improved.

Further, since the display device 40 is installed in the vehicle, it is possible to directly view the video while suppressing influence of raindrops even during rainfall. Further, it is possible to suppress influence of sunlight. Further, since the influence of heat is reduced, the operation can be stabilized.

In the present embodiment, when the extraction range displayed on the display device reaches the end portion of the video using the video of the area around the vehicle imaged by one imaging device 10 as the video serving as the process target, the notification indicating the reaching is given. However, the present embodiment is not limited thereto, and for example, a synthetic video obtained by synthesizing the videos of the area around the vehicle captured by two or more imaging devices whose imaged regions partially overlap may be used. The video serving as the process target may be the entire region of the synthetic video or may be a partial region obtained by clipping a region of a predetermined range of the synthetic video.

While various embodiments have been described herein above, it is to be appreciated that various changes in form and detail may be made without departing form the spirit and scope of the invention(s) presently or hereafter claimed.

CROSS-REFERENCE TO RELATED APPLICATION

This application is based upon and claims the benefit of priority from the prior Japanese Patent Application No. 2017-162629, filed on Aug. 25, 2017, the entire contents of which is incorporated herein by reference.

What is claimed is:

1. A display control device that is installed in a vehicle and causes a video of an area around the vehicle, from an imaging device, to be displayed on a display device, the display control device comprising:
   a memory that acquires a first video serving as a processing target from the imaging device;
   a receiver that receives a first instruction to move an extraction range for extracting at least a part of the first video acquired by the memory; and
   an output that outputs a second video extracted in the extraction range, moved in accordance with the instruction received by the receiver, to the display device,
   wherein, when the extraction range moved in accordance with the instruction received by the receiver reaches an end portion of the first video, the output gives a notification indicating a reaching of the end portion,
   the receiver further receives a second instruction to move the extraction range in a predetermined direction, and
   when the extraction range moved in the predetermined direction reaches the end portion of the first video, the output moves the extraction range in a direction opposite to the predetermined direction and then moves the extraction range in the predetermined direction, and returns the extraction range to the end portion of the first video.

2. A display control device that is installed in a vehicle and causes a video of an area around the vehicle, from an imaging device, to be displayed on a display device, the display control device comprising:
   a memory that acquires a first video serving as a processing target from the imaging device;
   a receiver that receives a first instruction to move an extraction range for extracting at least a part of the first video acquired by the memory; and
   an output that outputs a second video extracted in the extraction range, moved in accordance with the instruction received by the receiver, to the display device,
   wherein, when the extraction range moved in accordance with the instruction received by the receiver reaches an end portion of the first video, the output gives a notification indicating a reaching of the end portion,
   the receiver further receives a second instruction to move the extraction range in a first predetermined direction, and
   when the extraction range moved in the first predetermined direction reaches the end portion of the first video, the output outputs a third video in which a magnification ratio in a second predetermined direction is changed to be different between a side of the end portion of the first video in the extraction range and a side opposite to the end portion of the first video, and then outputs a fourth video in which the magnification ratio in the extraction range is restored to an original ratio.

3. A display control device that is installed in a vehicle and causes a video of an area around the vehicle, from an imaging device, to be displayed on a display device, the display control device comprising:
   a memory that acquires a first video serving as a processing target from the imaging device;
   a receiver that receives a first instruction to move an extraction range for extracting at least a part of the first video acquired by the memory; and
   an output that outputs a second video extracted in the extraction range, moved in accordance with the instruction received by the receiver, to the display device,
   wherein, when the extraction range moved in accordance with the instruction received by the receiver reaches an end portion of the first video, the output gives a notification indicating a reaching of the end portion,
   the receiver further receives a second instruction to move the extraction range in a predetermined direction, and
   when the extraction range moved in the predetermined direction reaches the end portion of the first video, the output outputs a third video in which a magnification ratio in a direction different from the predetermined direction is set to be different between a side of the end portion of the first video in the extraction range and a side opposite to the end portion of the first video, and in which the magnification ratio in the predetermined direction is changed on the basis of the side of the end portion of the first video, and then outputs a fourth video in which the magnification ratio in the extraction range is restored to an original ratio.

4. A display control device that is configured to be installed in a vehicle and to cause a video of an area around the vehicle, from an imaging device, to be displayed on a display device, the display control device comprising:
   a memory that acquires a first video serving as a processing target from the imaging device;
   a receiver that receives a first instruction to move an extraction range for extracting at least a part of the first video acquired by the memory; and
   an output that outputs a second video extracted in the extraction range, moved in accordance with the instruction received by the receiver, to the display device,
   wherein, when the extraction range moved in accordance with the instruction received by the receiver reaches an end portion of the first video, the output gives a notification indicating a reaching of the end portion, the receiver further receives a second instruction to move the extraction range in a horizontal direction of the vehicle, and when the extraction range moved in the horizontal direction of the vehicle reaches a preset pseudo boundary before the end portion of the first video, the output moves the extraction range toward the end portion of the first video beyond the pseudo boundary in the horizontal direction and then returns the extraction range to the pseudo boundary in the horizontal direction.

* * * * *